United States Patent
Beavers

(10) Patent No.: US 8,584,266 B1
(45) Date of Patent: Nov. 19, 2013

(54) TOILET SEAT LIFTING DEVICE

(76) Inventor: Melvin R. Beavers, Houston, TX (US)

( * ) Notice: Subject to any disclaimer, the term of this patent is extended or adjusted under 35 U.S.C. 154(b) by 337 days.

(21) Appl. No.: 13/034,743

(22) Filed: Feb. 25, 2011

(51) Int. Cl.
- A47K 13/10 (2006.01)
- F16F 3/08 (2006.01)
- F16F 1/36 (2006.01)
- F16F 1/00 (2006.01)

(52) U.S. Cl.
USPC ............ 4/246.1; 267/152; 267/153; 267/139; 267/140

(58) Field of Classification Search
USPC ........... 4/246.1, 246.5, 255.11, 241; 267/139, 267/140, 152, 153
See application file for complete search history.

(56) References Cited

U.S. PATENT DOCUMENTS

| | | | |
|---|---|---|---|
| 719,925 A * | 2/1903 | White | 4/248 |
| 2,877,469 A | 3/1959 | Johnson | |
| 3,669,467 A * | 6/1972 | Dunlap et al. | 280/124.116 |
| 4,152,863 A * | 5/1979 | Kubiatowicz | 446/486 |
| 4,195,372 A | 4/1980 | Farina | |
| 4,402,092 A | 9/1983 | Smallwood | |
| 4,780,914 A | 11/1988 | Lin | |
| 4,817,242 A | 4/1989 | Rapp | |
| 4,965,890 A | 10/1990 | Fischer | |
| 5,379,465 A * | 1/1995 | Vaughn | 4/246.1 |
| 5,468,093 A * | 11/1995 | Voigt | 404/6 |
| 5,689,838 A * | 11/1997 | MacKenzie | 4/246.1 |
| 6,012,180 A * | 1/2000 | Williams | 4/241 |
| 7,806,746 B2 * | 10/2010 | Walterscheid | 446/308 |
| 7,913,962 B2 * | 3/2011 | Takahashi et al. | 248/205.5 |
| 2007/0044215 A1 | 3/2007 | Chiu | |
| 2009/0199330 A1 * | 8/2009 | Tong | 4/246.1 |

* cited by examiner

*Primary Examiner* — Gregory Huson
*Assistant Examiner* — Christine Skubinna
(74) *Attorney, Agent, or Firm* — Robert C. Montgomery; Montgomery Patent & Design

(57) ABSTRACT

A toilet seat lifting device maintains a toilet seat in a partially elevated position when at rest. The device includes a lifting spring attached to a toilet rim. The lifting spring includes a compressible air bellow which provides resistance for maintaining a front end of the toilet at a prescribed angle when in the resting state. The spring is compressible such that a user may depress the toilet seat to a flat position when seated. The seat is not attached to the spring such that the seat can be lifted to an upright position in a traditional manner. The spring is attached to the toilet rim underneath the toilet seat, adjacent to a hinge by an adhesive.

11 Claims, 3 Drawing Sheets

TOILET SEAT LIFTING DEVICE

RELATED APPLICATIONS

The present invention was first described in a notarized Official Record of Invention on May 6, 2010, that is on file at the offices of Montgomery Patent and Design, LLC, the entire disclosures of which are incorporated herein by reference.

FIELD OF THE INVENTION

The present invention relates generally to toilet seats, and in particular, a toilet seat lifting device for raising and maintaining a toilet seat to a desired upward angle relative to a toilet bowl.

BACKGROUND OF THE INVENTION

The occurrence of a male using a toilet with the seat in a lowered position is common, especially with younger male children and those who may have difficulty in bending over due to a physical disability. These individuals regularly find it cumbersome to reach all of the way down to a lowered toilet seat simply to raise it. Unfortunately, no matter how careful the aim, urine is bound to splash on the seating surface. This presents a very unsanitary condition and an annoyance to those who follow and wish to use the toilet in a seated position.

To address this problem, various seat lifting devices have attempted to make the act of lifting the toilet seat easier by providing a handle or other grippable member for the user to use to lift the seat. Other devices attempt to provide some type of foot-actuated seat lifting mechanism. However, these attempts still require active participation by the toilet user for them to be effective.

Sill other devices attempt to maintain the seat in a generally vertical position or at an upward angle relative to the toilet bowl. Typically, these devices rely on a spring mechanism in mechanical communication with the toilet seat hinges or are disposed between the toilet seat and the toilet rim. While these attempts may achieve their purported objectives each suffers from one or more disadvantage or deficiency related to design or utilization. Particularly, these device can be cumbersome to install and can become ineffective over time due to wear and over use. Due to the general complexity of the design and mechanisms, these devices can be relatively expensive to replace or repair. Additionally, urine and other fecal matter can collect within the moving parts which can also become unsanitary.

SUMMARY OF THE INVENTION

The inventor has therefore recognized the aforementioned inherent problems and lack in the art and observed that there is a need for a device and a method of use by which the raising and lowering of a toilet seat and lid can be accomplished in an automatic manner, such that it does not pose an imposition to people of either sex and allows for the keeping of a toilet seat in a generally cleaner condition. In accordance with the invention, it is an object of the present disclosure to solve these problems.

The inventor recognized these problems and has addressed this need by developing a toilet seat lifter that allows for the raising and lowering of a toilet seat and lid in a quick, simple, and effective manner. The inventor has thus realized the advantages and benefits of providing a spring fastened to a top surface of a toilet rim below a bottom surface of a toilet seat. The spring biases a front end of the toilet seat at a desired angle above horizontal. The spring includes a flexible and resilient base having a hemispherical body and an annular outside edge. A stem protrudes upwardly from a top end of the base opposite the outside edge. The outside edge is fastened to the toilet rim by an adhesive layer disposed around the annular ring. An upper end of the stem contacts the toilet seat bottom surface when the seat is lowered into the rest position. The base provides an upward reaction force in response to a downward force applied to the stem by the seat alone and maintains a front end of the seat at an upward angle relative to the toilet bowl. A downward force applied by a combination of the toilet lid and the toilet seat or when a user is sitting on the toilet seat overcomes the reaction force, such that the toilet seat rest in a generally horizontal position in contact with the toilet rim upper surface.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
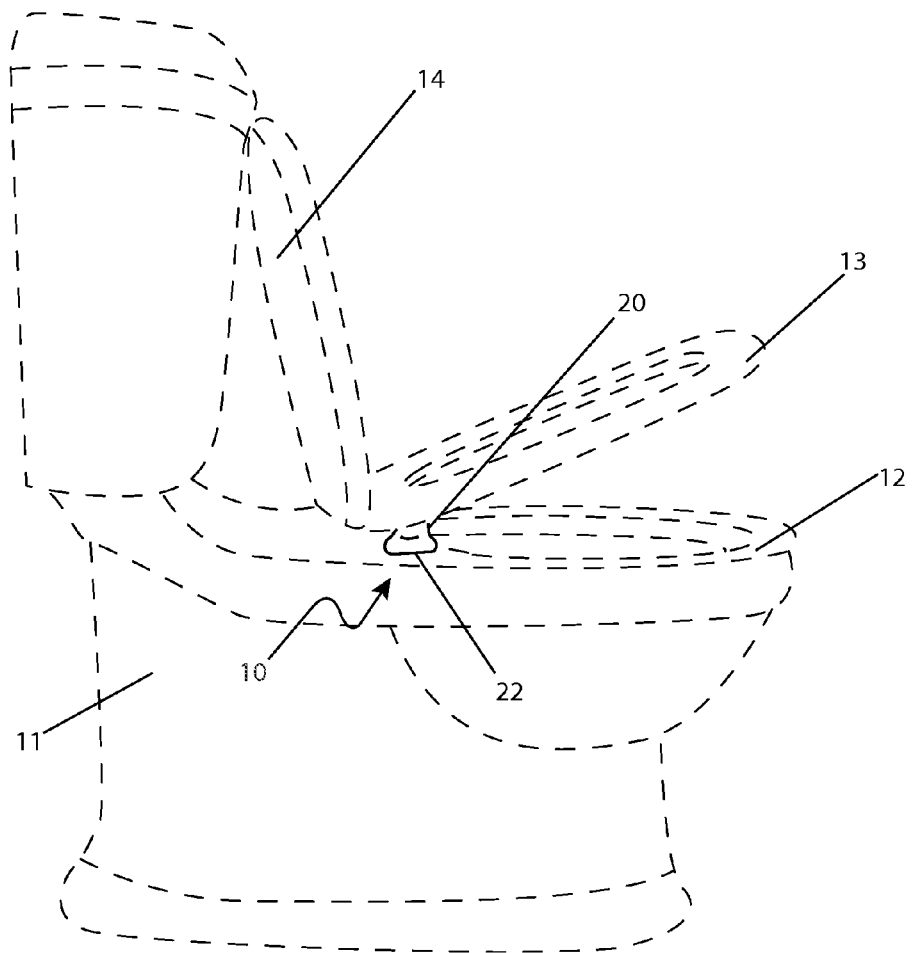
FIG. 1 is an environmental view of a toilet seat lifting device 10, according to a preferred embodiment in accordance with the invention.

| DESCRIPTIVE KEY | |
|---|---|
| 10 | toilet seat lifter |
| 11 | toilet |
| 12 | toilet rim |
| 13 | toilet seat |
| 14 | toilet lid |
| 20 | body |
| 21 | stem |
| 22 | base |
| 23 | interior portion |
| 24 | backing |
| 25 | adhesive |

DETAILED DESCRIPTION OF THE PREFERRED EMBODIMENT

In accordance with the invention, the best mode is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 5, depicting a toilet seat lifting device (herein described as a "device") 10, where like reference numerals represent similar or like parts. The device 10 is a spring that biases a toilet seat 13 in an elevated angle when in a resting position, compared to the seat 13 normally being in a down or horizontal position when in the resting position. This elevation limits the amount of lifting required to pivot the toilet seat 13 to an upright position ninety degrees (90°) from the resting position. The device 10 is especially useful for male users are may not always lift the toilet seat 13 to the upright position due to a physical disability or indolence, which can result in occasionally missing a bowl of the toilet 11 and urinating on the toilet rim 13. The device 10 also compresses flat when a downward force is applied to the device 10.

FIG. 1 shows an environmental view of the device 10. The device 10 biases the toilet seat 13 in a slightly elevated position after the toilet lid 14 has been lifted, to limit the amount of effort the user must exert to lift the toilet seat 13 into the upright position. The device 10 is fastened to a top surface of a rear end of the toilet rim 12 adjacent to a rear hinge. This position biases a front end of the toilet seat 13 at a slightly upward angle.

The device 10 is preferably fabricated from a dynamic rubber material having a preferred thickness of approximately between one-sixteenth (1/16) and one-eighth (1/8) of an inch. Preferably the material has a durometer value approximately between 55 and 60. It can be appreciated to one of ordinary skill that other materials having similar material characteristics can be utilized without limiting the scope of the device 10. The rubber material utilized for construction of the device 10 includes elastic or memory qualities which enables the device 10 to return to a natural state after compression. The material of the device 10 has resiliency characteristics such that the downward force created by the combined weight of the toilet seat 13 and toilet seat lid 14 will compress the material and squash the device 10. The weight of the toilet seat 13 alone will not fully compress the device 10, such that the seat 13 is propped up at its base by the device 10. The device 10 can include script, logos, and images such as, but not limited to, sports names and logos, personal names, symbols, pictures, and similar surface ornamentation to further customize and personalize the device 10. The device 10 is intended to also be introduced with the forming material having a variety of colors and patterns.

Figure 2:
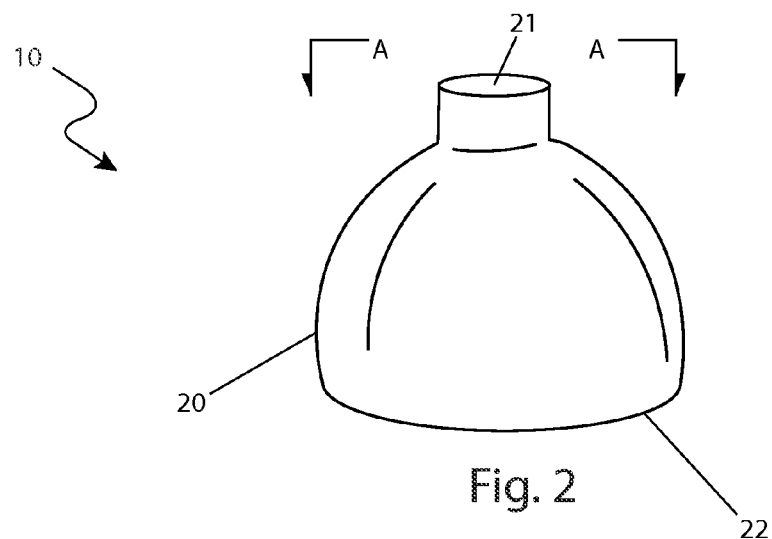
FIG. 2 is a top perspective view of the toilet seat lifting device 10, according to the preferred embodiment.
Figure 3:
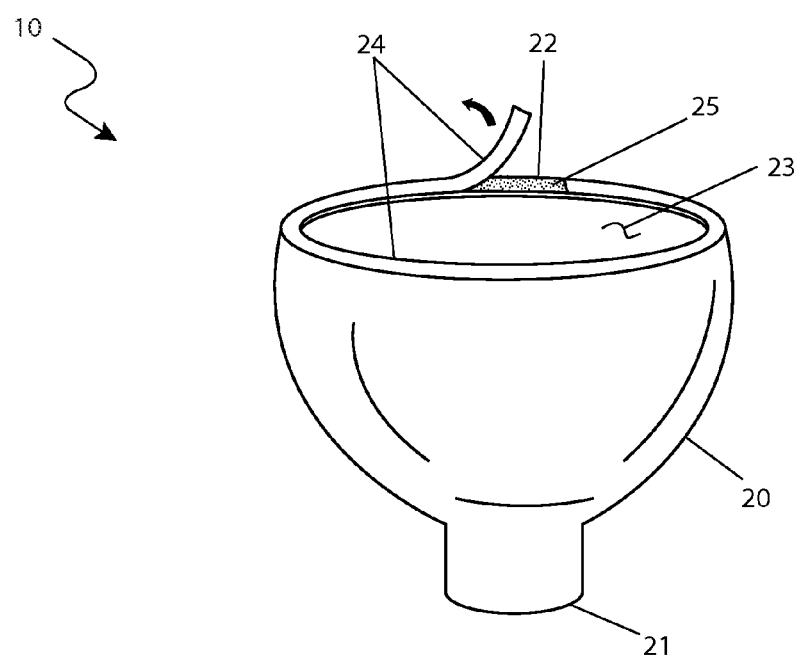
FIG. 3 is a bottom perspective view of the toilet seat lifting device 10, according to the preferred embodiment.
Figure 4:
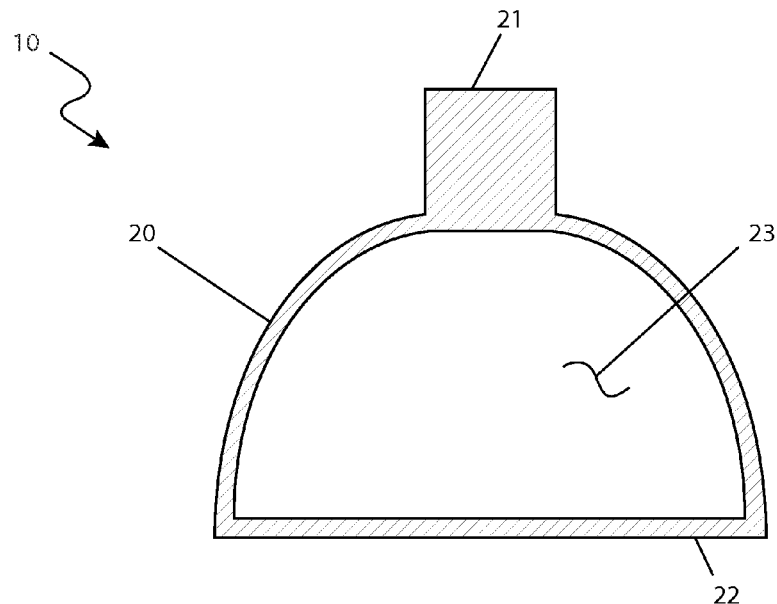
FIG. 4 is a section view of the toilet seat lifting device 10 taken along line A-A of FIG. 2, according to the preferred embodiment.

FIG. 2 shows a top perspective view of the device 10; FIG. 3 shows a bottom perspective view of the device 10. FIG. 4 shows a section view of the device 10 taken along line A-A of FIG. 2. The device 10 includes funnel-shaped body 20 having a narrow stem 21 which is oriented to engage a bottom surface of the toilet seat 13 and a wide, bell-shaped base 22 which is fastened to the top surface the toilet rim 12. The stem 21 prevents the toilet seat 13 from completely closing against the toilet rim 12. The stem 21 is a solid member and is integral to the base 22. The length of the stem 21 can be selectively defined adjusted by cutting the stem 21 to a desired length with a cutting tool such as, but not limited to: a knife, scissors, or the like. The length of the stem 21 corresponds to the relative angle of the front end of the toilet seat 13.

The base 22 is hollow which allows for compression when a downward force is applied to the stem 21. The base 22 also includes a backing 24 which is peeled away to reveal an adhesive 25 disposed on an outside edge of the annular base 21. The backing 24 is preferably a wax paper that will not stick to the adhesive 25. The adhesive 25 fastens the device 10 to the toilet rim 12 in the preferred location near the rear hinge, yet other locations may be utilized without limiting the scope of the device 10. The device 10 can also include an air release aperture through the base 20 disposed at any location. The air release aperture allows for air to vent when the device 10 is compressed and decompressed back to an original state, such that the seal created by the adhesive 25 and the rim 12 does not blow out or a vacuum is not formed. Alternately, the outside edge of the base 20 can be only partially covered with the adhesive 25, such that air can vent between the base 20 and the rim 12 during use.

Figure 5:
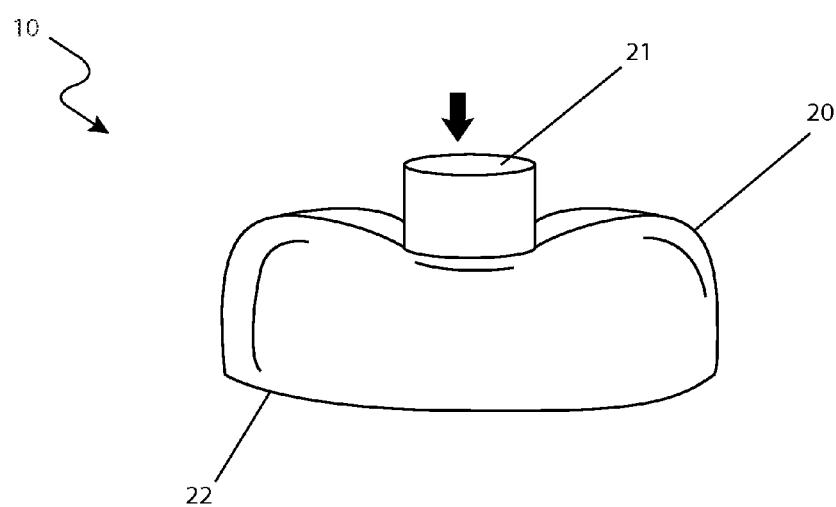
FIG. 5 is top perspective view of the toilet seat lifting device 10 depicted in a compressed state, according to the preferred embodiment.

FIG. 5 shows a top perspective view of the device 10 depicted in a compressed state. When the downward force is applied, such as when a person sits upon the toilet seat 13 or when the toilet lid 14 is in the downward and closed position, the stem 21 compresses into an interior portion 23 (see FIG. 3) of the base 22. Compression of the device 10 allows the toilet seat 13 or toilet lid 14 to lay flat and parallel to the toilet rim 12.

It is envisioned that other styles and configurations of the present invention can be easily incorporated into the teachings of the present invention, and only one particular configuration shall be shown and described for purposes of clarity and disclosure and not by way of limitation of scope.

In accordance with the invention, the preferred embodiment can be utilized by the user in a simple and effortless manner with little or no training. After initial purchase or acquisition of the device 10, it would be installed as indicated in FIG. 1.

The method of utilizing the device 10 may be achieved by performing the following steps: acquiring the device 10; cutting the stem 21 to a desired length via a common cutting tool; removing the backing 24 from the base 22; engaging the adhesive 25 on the base 22 with the toilet rim 12; enabling the toilet seat 13 to lay upon the stem 21, thereby angling the toilet seat 13; utilizing the toilet 11 in a common manner and limiting the amount of urine splashed upon the toilet seat 13; closing the toilet lid 14 or sitting upon the toilet seat 13 to completely depress the device 10; and, utilizing the device 10 to raise and lower the toilet seat 13 in a quick, simple, and effective manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:
1. A toilet seat lifting device comprising:
a flexible, resilient base having a hemispherical body and an annular outside edge, said outside edge being configured to connect to a toilet rim; and, a stem, comprising a solid cylindrical body, protruding upwardly from a top end of said base opposite said outside edge, said stem being configured to contact an underside surface of said toilet seat;

wherein said base provides an upward force in response to an opposed downward force, said upward force being greater than said downward force generated by the mass of said toilet seat in order to maintain said toilet seat at a non-zero angle relative to said toilet rim, said non-zero angle being less than 90 degrees; and wherein said upward force is less than said downward force generated by the mass of said toilet seat combined with the mass of a toilet lid in order to allow said toilet seat and said toilet lid in combination to be positioned parallel to said toilet rim.

2. The device of claim 1, wherein said base further comprises an adhesive layer disposed on said outside edge for adhering to said toilet rim.

3. The device of claim 2, wherein said base further forms a hollow interior portion.

4. The device of claim 3, wherein said base further comprises a removable backing temporarily adhered to said adhesive.

5. The device of claim 1, wherein said stem prescribed comprises a length;

wherein said length defines said non-zero angle relative to said toilet rim.

6. The device of claim 5, wherein said stem is trimmable to a prescribed length;

wherein said prescribed length defines said non-zero angle relative to said toilet rim.

7. The device of claim 6, wherein said base comprises a durometer value of between 55 and 60.

8. The device of claim 7, wherein said base further comprises an adhesive layer disposed on said outside edge for adhering to said toilet rim.

9. The device of claim 8, wherein said base further comprises a removable backing temporarily adhered to said adhesive.

10. A method for biasing a toilet seat at a non-zero angle relative to a toilet rim when not in use, said method comprising;

providing a toilet comprising at least a toilet bowl having a rim and a toilet seat hingedly attached to a rear of said rim, and a toilet lid hingedly attached to a rear of said rim;

providing a toilet seat lifting device comprising a flexible, resilient base having a hemispherical body defining a hollow interior portion and an annular outside edge and a solid stem protruding upwardly from a top end of said base opposite said outside edge, said base providing an upward force in response to an opposed downward force, said stem comprising a length;

lifting said seat and said lid upwardly to a generally vertical position relative to said rim;

fastening said outside edge of said base to a top surface of said toilet rim;

lowering said toilet seat until a bottom surface contacts a top of said stem, such that said downward force generated by the mass of said toilet seat is less than said upward force in order to maintain said toilet seat at a non-zero angle relative to said rim, said non-zero angle being less than 90 degrees; and lowering said toilet lid until a bottom surface contacts a top surface of said seat, such that said downward force generated by the mass of said seat combined with the mass of said lid is greater than said upward force in order to allow said toilet seat and said toilet lid in combination to be positioned parallel to said rim.

11. The method of claim 10, further comprising the steps of:

trimming said length of said stem defines said non-zero angle relative to said toilet rim.

* * * * *